United States Patent [19]

Arakawa et al.

[11] Patent Number: 5,327,064

[45] Date of Patent: Jul. 5, 1994

[54] BRUSHLESS MOTOR INCORPORATING AN INTEGRATED CIRCUIT HAVING A SINGLE CHIP PERIPHERAL CIRCUIT

[75] Inventors: Noriaki Arakawa, Tochigi; Makoto Isii, Utsunomiya; Yasutsugu Kawaguchi, Tochigi, all of Japan

[73] Assignee: Hitachi, Ltd., Tokyo, Japan

[21] Appl. No.: 92,575

[22] Filed: Jul. 16, 1993

Related U.S. Application Data

[63] Continuation of Ser. No. 723,389, Jun. 28, 1991, abandoned.

[30] Foreign Application Priority Data

Jul. 6, 1990 [JP] Japan .................... 2-177452
Jul. 6, 1990 [JP] Japan .................... 2-177453

[51] Int. Cl.$^5$ .......................... H01H 35/00
[52] U.S. Cl. ........................ 318/801; 307/117; 307/200.1
[58] Field of Search .......... 318/798, 800, 801, 802, 318/803, 805, 806, 807, 809, 810, 811, 685, 254; 307/117, 200.1

[56] References Cited

U.S. PATENT DOCUMENTS

| 4,031,448 | 6/1977 | Adachi | 318/685 |
| 4,698,744 | 10/1987 | Itani et al. | 318/802 |
| 4,994,950 | 2/1991 | Gritter | 318/811 |
| 5,006,733 | 4/1991 | Goldberg | 318/685 |

FOREIGN PATENT DOCUMENTS

WO8807285 9/1988 PCT Int'l Appl. .

OTHER PUBLICATIONS

"Japan Radio Newspaper", Mar. 22, 1990.
Electronic Design, vol. 37, No. 3, Feb. 1989, pp. 111–113, F. Goodenough: "User-shaped control chip runs brushless DC motors", Hasbrouck Hgts., N.J., U.S.A.
Electronic Design, vol. 36, No. 9, Apr. 14, 1988, F. Goodenough: "Motor-control-semi-conductors drive motor revolution", Hasbrouck Hgts., N.J., U.S.A., pp. 78–80, 82–84, 86, 88, 90, 92, 94.
Siemens Components, vol. XXII, Nol 3, Jun. 1987, pp. 110–115, B. Schwager: "Communication circuit for single-phase brushless DC motors"0 Berlin, Germany.
Electronic Engineering, vol. 58, No. 719, Nov. 1986, pp. 51–52, 55–56, 59, London, GB; P. Davis, et al: "Three phase control and drive IC for brushless motors".
Machine Design, vol. 61, No. 16, Aug. 10, 1989, pp. 120, 122, 124–125, Cleveland, Ohio U.S.A.; R. Benzer: "New ICs for brushless DC motor control".

Primary Examiner—William M. Shoop, Jr.
Assistant Examiner—John W. Cabeca
Attorney, Agent, or Firm—Antonelli, Terry, Stout & Kraus

[57] ABSTRACT

A brushless motor accommodated within a case and having mounted on a substrate rotor speed detection sensors and a monolithic integrated circuit which includes an inverter for driving the rotor, drive circuits for driving the inverter, power source circuit for supplying a power required by each circuit, circuits for controlling the speed of the rotor and a protection circuit for protecting the inverter from excess current.

11 Claims, 11 Drawing Sheets

BRUSHLESS MOTOR INCORPORATING AN INTEGRATED CIRCUIT HAVING A SINGLE CHIP PERIPHERAL CIRCUIT

This application is a continuation of application Ser. No. 07/723,389, filed Jun. 28, 1991, now abandoned.

BACKGROUND OF THE INVENTION

The present invention relates to a motor which is suitable for application as the motor for driving a fan for a room air conditioner or the like, and, more particularly, to a brushless motor incorporating an inverter which enables variable speed control.

Recently, as shown in "Japan Radio Newspaper" on Mar. 22, 1990, a high-voltage single chip three-phase inverter (hereinafter referred to as a one-chip three-phase inverter) has been developed which controls the speed of a motor by utilizing a direct power source voltage that is obtained by rectifying and smoothing a commercial AC voltage of 100 (V). The one-chip three-phase inverter is extremely small as compared with the conventional inverter and can be housed in a motor.

Figure 1A:
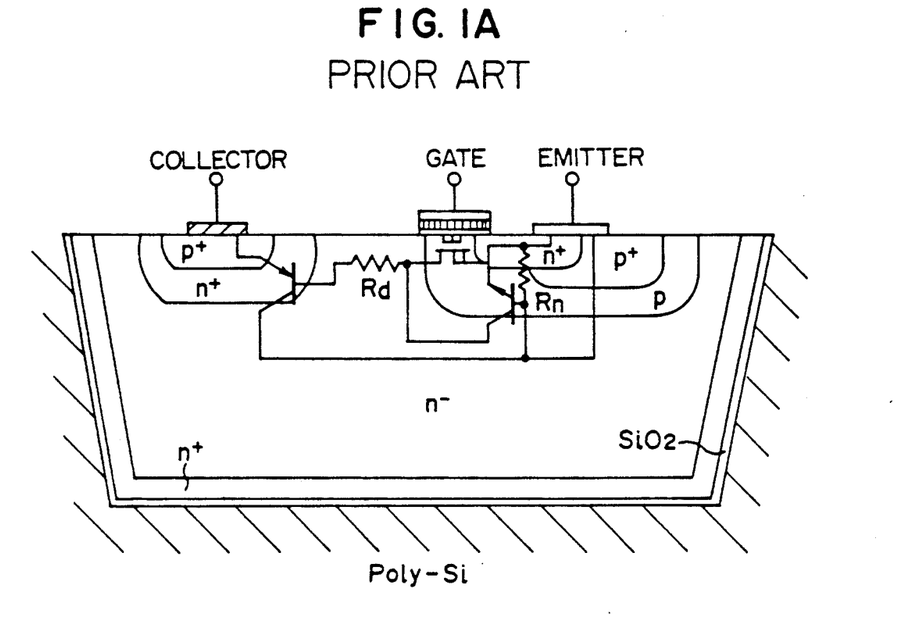
FIG. 1A is a partial cross sectional diagram of the integrated circuit of a one-chip three-phase inverter relating to the present invention.

As shown in FIG. 1A, this three-phase one-chip inverter has a structure such that polysilicon is used as the base or substrate, and the area of each phase inverter portion is formed in a respectively separate region and is isolated by a dielectric layer, such as $SiO_2$, and has a high withstand voltage.

Figure 2:
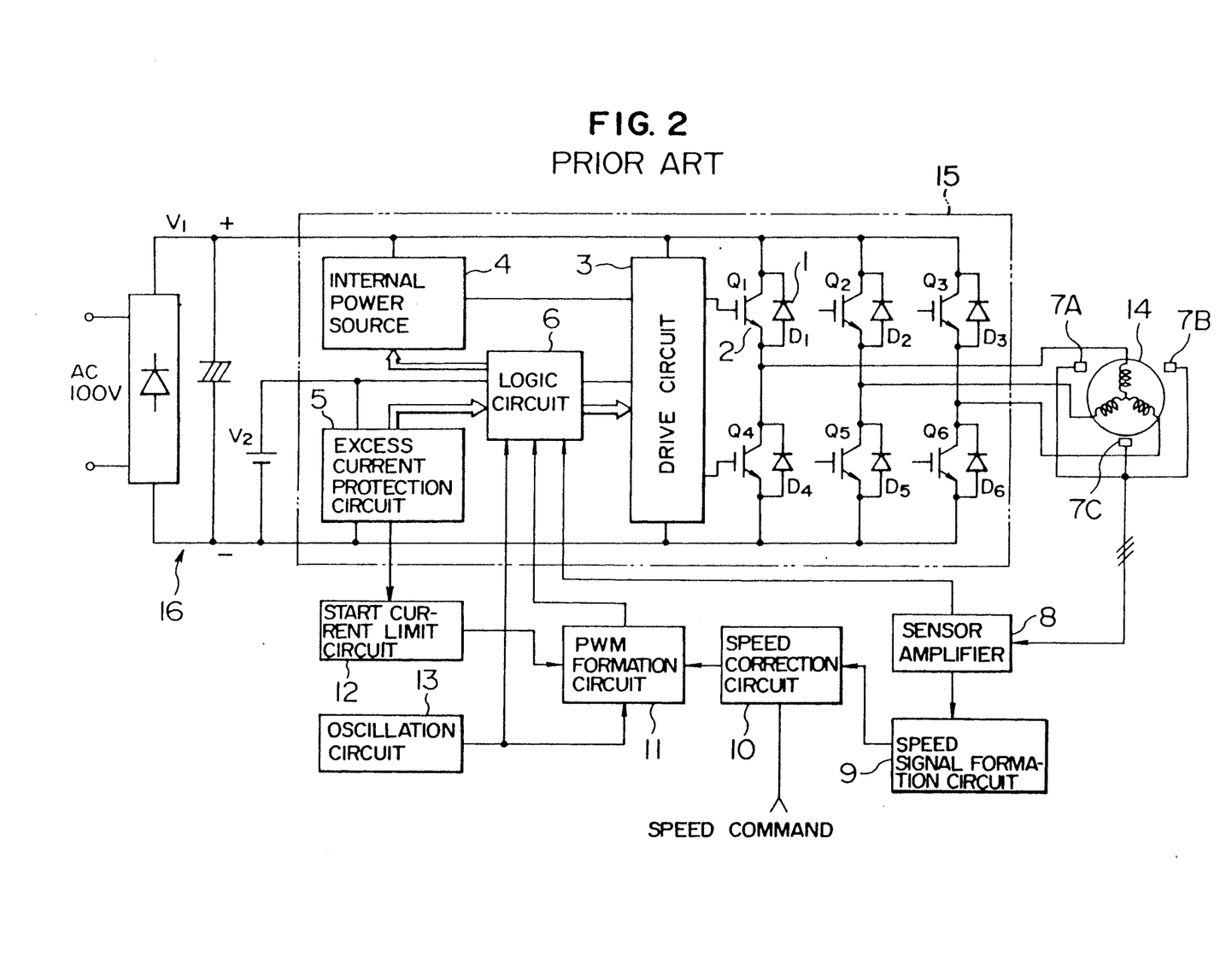
FIG. 2 is a block diagram showing the circuit system of a motor using a one-chip three-phase inverter.

The circuits in the two-dotted line of FIG. 2 are integrated on the one-chip.

Figure 1B:
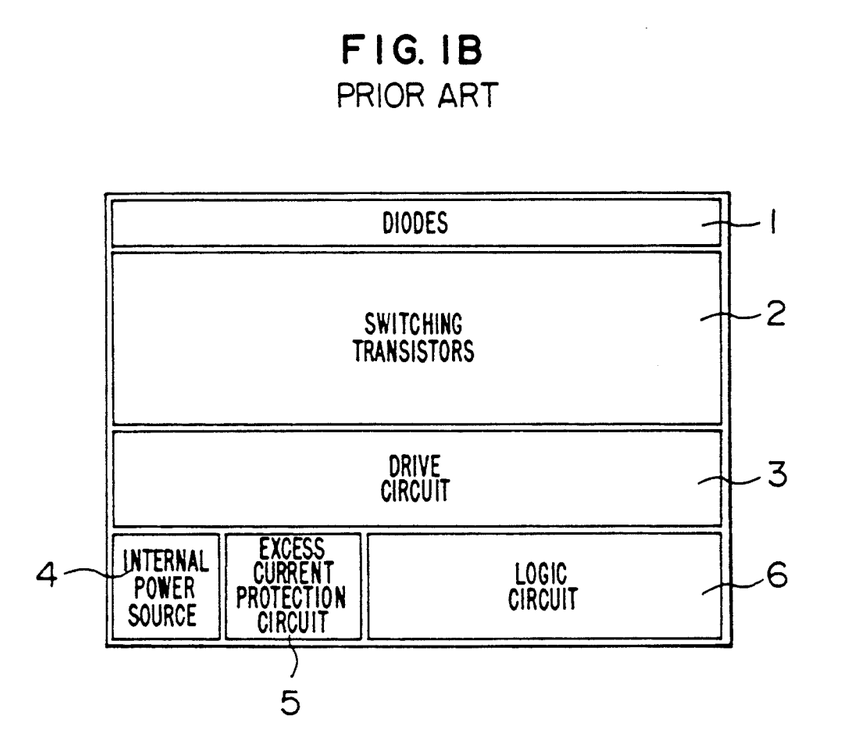
FIG. 1B is a plan view showing the layout of the integrated circuit of FIG. 1A.

FIG. 1B is a plan view showing the layout of each element of the one-chip three-phase inverter. As is clear from this diagram, this one-chip three-phase inverter comprises, in a single chip integrated circuit, six switching transistors 2 as main elements, a diode 1 for turning off the switching transistors 2 connected between the collector and the emitter of each of the switching transistors 2, a logic circuit 6 for forming a switching signal for turning on and off each of the switching transistors 2, a drive circuit 3 for on- and off- driving each switching transistor with this switching signal, an excess current protection circuit 5 for preventing the integrated circuit from being destroyed by an excess current, by detecting a current that flows through the switching transistors 2, and an internal power source 4. The integrated circuit element of the one-chip three-phase inverter has the dimensions of a 4.3 mm length and a 5.8 mm width.

In the one-chip three-phase inverter explained above, a lateral Insulated Gate Bipolar Transistor (IGBT) has been developed and employed as the switching transistor 2 to have a substantially reduced area as compared with the conventional power MOSFET. At the same time, a high-speed diode has been newly developed and employed that can be prepared in the same process as that of the lateral IGBT, so that an inverse recovery current is reduced substantially thereby to reduce substantially the switching loss of the switching transistors 2 due to inverse recovery current. Further, a power source circuit is incorporated in the one-chip three-phase inverter to require only one external power source for driving the switching transistors 2 that form the power element. The excess current protection circuit 5 is also incorporated in the one-chip three-phase inverter to prevent the integrated circuit from being destroyed by an excess current that is generated by short-circuiting of a load or the like. Further, the inverter frequency is set to 20 KHz which is higher than an audio frequency so that noise of the motor can be reduced substantially.

FIG. 2 is a block diagram showing a brushless motor that uses the one-chip three-phase inverter as described above. 7A, 7B and 7C designate Hall device sensors, 8 a sensor amplifier, 9 a speed signal formation circuit, 10 a speed correction circuit, 11 a pulse width modulation (PWM) signal formation circuit, 12 a start current limit circuit, 13 an oscillation circuit, 14 a stator, 15 the above-described one-chip three-phase inverter, and 16 an external power source.

Referring to FIG. 2, when a commercial AC voltage of 100 (V) is applied to the external power source 16, a DC power source voltage (VI) is applied to each circuit from the external power source 16. By applying a voltage (VZ) for a signal, the oscillation circuit 13 is started. When a speed command is given to the speed correction circuit 10 from an external circuit, the drive circuit 3 on- and off- drives each of the switching transistors 2 sequentially according to signals generated from the logic circuit 6. Then, a current flows to each coil provided in the stator 14 in a predetermined direction, so that a rotor, not shown, starts rotation to start the motor.

When the motor is started, the start current limit circuit 12 controls the PWM signal formation circuit 11 based on the result of detection by the excess current protection circuit 5 so that the start current flowing through each switching transistor 2 is not excessive, thereby to adjust the duty ratio of the PWM signal.

Assume that the switching transistors 2 are expressed as $Q_1$, $Q_2$, $Q_3$, $Q_4$, $Q_5$ and $Q_6$ and the diodes 1 to be connected to these switching transistors 2 are expressed as $D_1$, $D_2$, $D_3$, $D_4$, $D_5$ and $D_6$. Then, the collectors of the switching transistors $Q_1$ to $Q_3$ are connected to the + terminal of the external power source 16 and the emitters of the switching transistors $Q_4$ to $Q_6$ are connected to the terminal of the external power source 16. The emitter of the switching transistor $Q_1$ and the collector of the switching transistor $Q_4$ are connected to the first coil provided in the stator 14. Similarly, the emitter of the switching transistor $Q_2$ and the collector of the switching transistor $Q_5$ are connected to the second coil, and the emitter of the switching transistor $Q_3$ and the collector of the switching transistor $Q_6$ are connected to the third coil.

Figure 3:
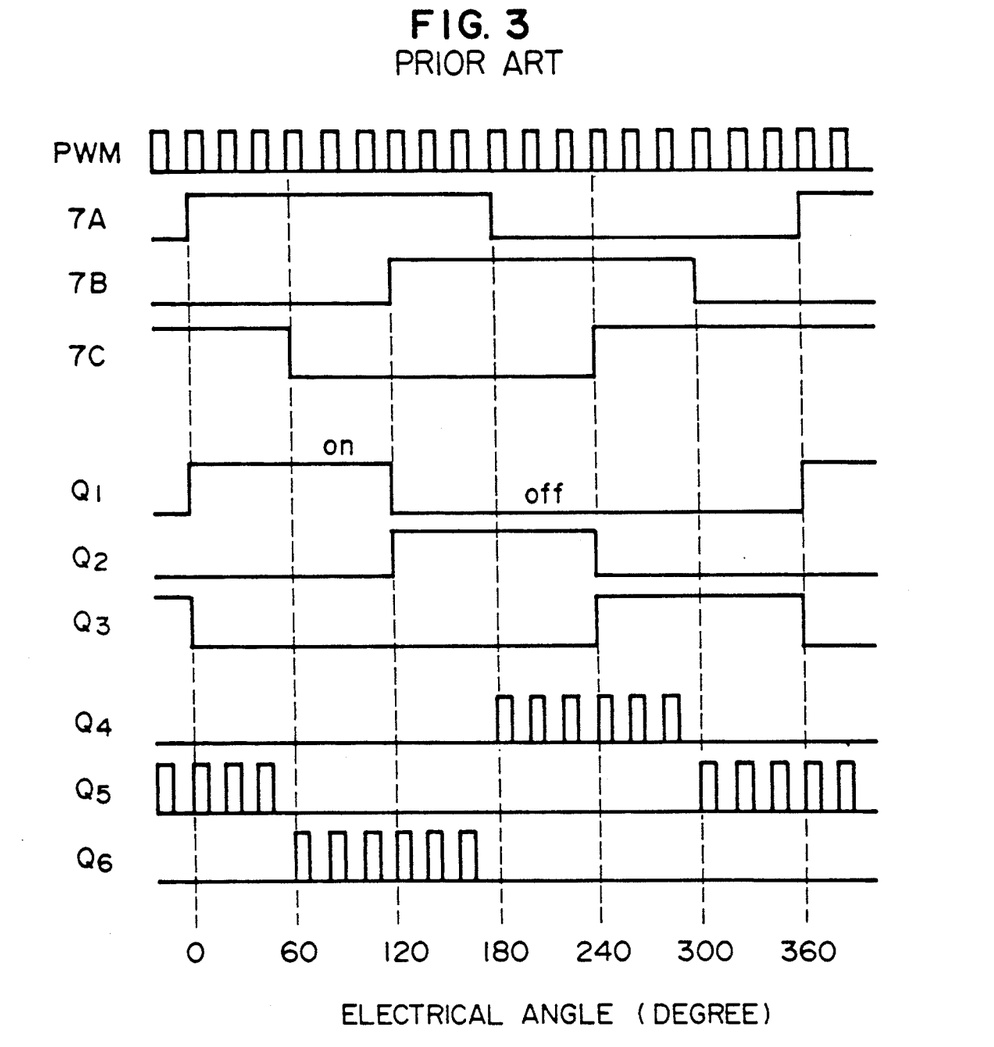
FIG. 3 is a diagram for explaining the operation of the motor in FIG. 2.

The drive circuit 3 turns on the switching transistors $Q_1$, $Q_2$ and $Q_3$ sequentially at an electrical angle of every 120 degrees, and turns on the switching transistors $Q_4$, $Q_5$ and $Q_6$ sequentially by chopping with a PWM signal at an electrical angle of every 120 degrees. The driving timings of the switching transistors $Q_1$ to $Q_6$ are shown as $Q_1$ to $Q_6$ in FIG. 3. In FIG. 3, the switching transistor $Q_4$ is turned on and off at the same cycle and the same duty ratio as those of the PWM signal during the period from the latter half of the on-period of the switching transistor $Q_2$ to the former half of the on-period of the switching transistor $Q_3$, the switching transistor $Q_5$ is turned on and off at the same cycle and the same duty ratio as those of the PWM signal during the period from the latter half of the on-period of the switching transistor $Q_3$ to the former half of the on-period of the switching transistor $Q_1$, and the switching transistor $Q_6$ is turned on and off at the same cycle and the same duty ratio as those of the PWM signal during the period from the latter half of the on-period of the switching transistor $Q_1$ to the former half of the on-period of the switching transistor $Q_2$.

As described above, when the motor starts, the Hall device sensors 7A, 7B and 7C detect the rotation of the rotor, and generate rotor position signals of an electrical angle of 180-degree width, with phase differences of an electrical angle 120 degrees at a rotor rotation electrical angle of 360 degrees. These rotor position signals are amplified and waveform-shaped by the sensor amplifier 8 which has been adjusted to a predetermined gain. These signals are then supplied to the logic circuit 6 of the one-chip three-phase inverter 15, and one of the rotor position signals, for example the rotor position signal generated in the Hall device sensor 7A, is supplied to the speed signal formation circuit 9 so that a speed signal representing the speed of the rotor is formed by the frequency or cycle of the rotor position signal. The speed signals are supplied to the speed correction circuit 10 and compared with the speed command supplied from the outside, so that a speed correction signal is formed in accordance with the difference between the signals. The duty ratio of the PWM signal outputted from the PWM signal formation circuit 11 is controlled by the speed correction signal.

In order to improve the precision of speed detection, three speed signals obtained from the three Hall device sensors can be inputted into the speed signal formation circuit 9.

The logic circuit 6 forms a commutation signal (switching signal) for sequentially turning on and off the switching transistors $Q_1$ to $Q_3$ with an electrical angle 120 degrees and a deviated phase of every 120 degrees from the three-phase rotor position signals supplied from the sensor amplifier 8, and a switching signal having the same cycle and the same duty ratio as those of the PWM signal supplied from the PWM signal formation circuit 11 with the timing explained in FIG. 3 in accordance with this commutation signal, and sends these signals to the drive circuit 3.

By the above arrangement, a current conduction time for each coil provided in the stater is controlled in accordance with the duty ratio of the PWM signal that has been corrected by the speed correction signal from the speed correction circuit 10, and the rotor speed is controlled to be consistent with the external speed command. When the rotor speed changes, the output cycles of the Hall device sensors 7A, 7B and 7C also change accordingly.

As described above, the rotor speed is determined by the duty ratio of the PWM signal, and the speed of the motor can be changed by changing the duty ratio.

Figure 4:
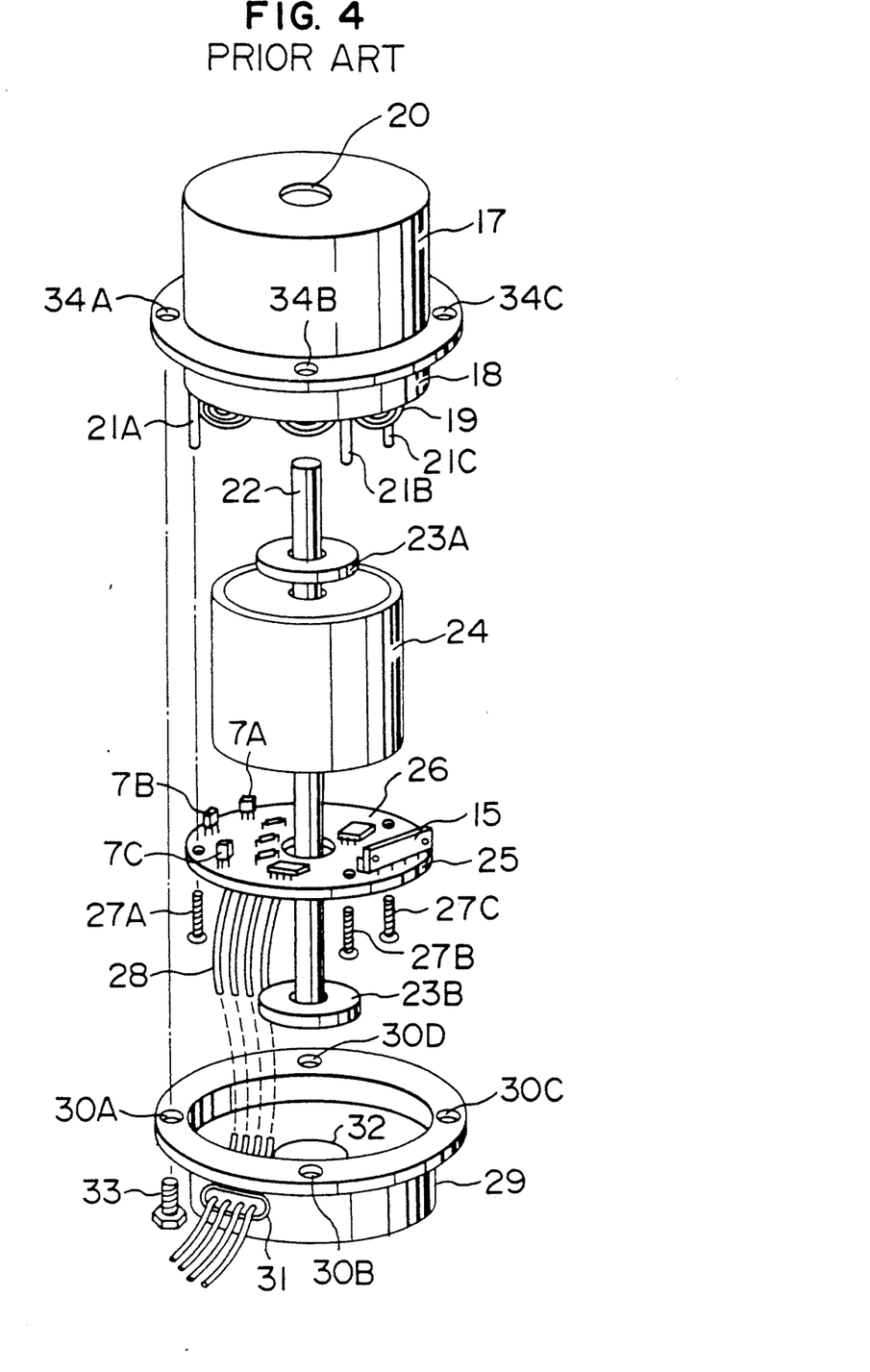
FIG. 4 is an exploded perspective view of the motor in FIG. 2.

FIG. 4 is an exploded perspective view showing one example of a conventional motor incorporating a one-chip three-phase inverter, based on the circuit structure shown in FIG. 2. 17 designates an upper case, 18 a stator core, 19 a coil, 20 an aperture, 21A, 21B and 21C supporting members, 22 a shaft, 23A and 23B bearings, 24 a rotor, 25 a printed wiring panel, 26 a peripheral circuit, 27A, 27B and 27C bolts, 28 lead wires, 29 a lower case, 30A, 30B, 30C and 30D openings, 31 a drawing duct, 32 an opening, 33 a bolt and 34A, 34B and 34C bolt holes.

Referring to FIG. 4, the cylindrical stator core 18 having the coil 19 wound up in an internal slot is engaged inside the upper case 17. The opening 20 is provided at the center of the upper surface of the upper case 17, and an edge portion is formed at the lower end of the external periphery of the opening 20. The four bolt holes 34A, 34B, 34C and 34d (the last of which is not shown because it is located at the rear side) are provided at equal intervals around the edge portion. The bar-shaped supporting members 21A, 21B and 21C which stretch downward are provided around equal intervals at the external periphery of the lower surface of the stator core 18.

The rotor 24 is covered with a ferrite magnetic material having a thickness of about 2 mm on the peripheral surface, and the shaft 22, passing through the center of the rotor 24, is integrated. The bearings 23A are fixed to the shaft 22 above the rotor 24, and the bearings 23B are fixed to the lower end of the shaft 22. The printed wiring substrate 25, having the shaft 22 passing through it, is provided between the rotor 24 and the bearings 23B.

The lower case 29 is provided with the opening 32 at the center of the bottom and the drawing duct 31 which passes through the side. The lower case 29 is also provided with an edge portion which extends outwardly at the upper side, and the openings 30A, 30B, 30C and 30D are provided at equal intervals at the edge portion.

Figure 6:
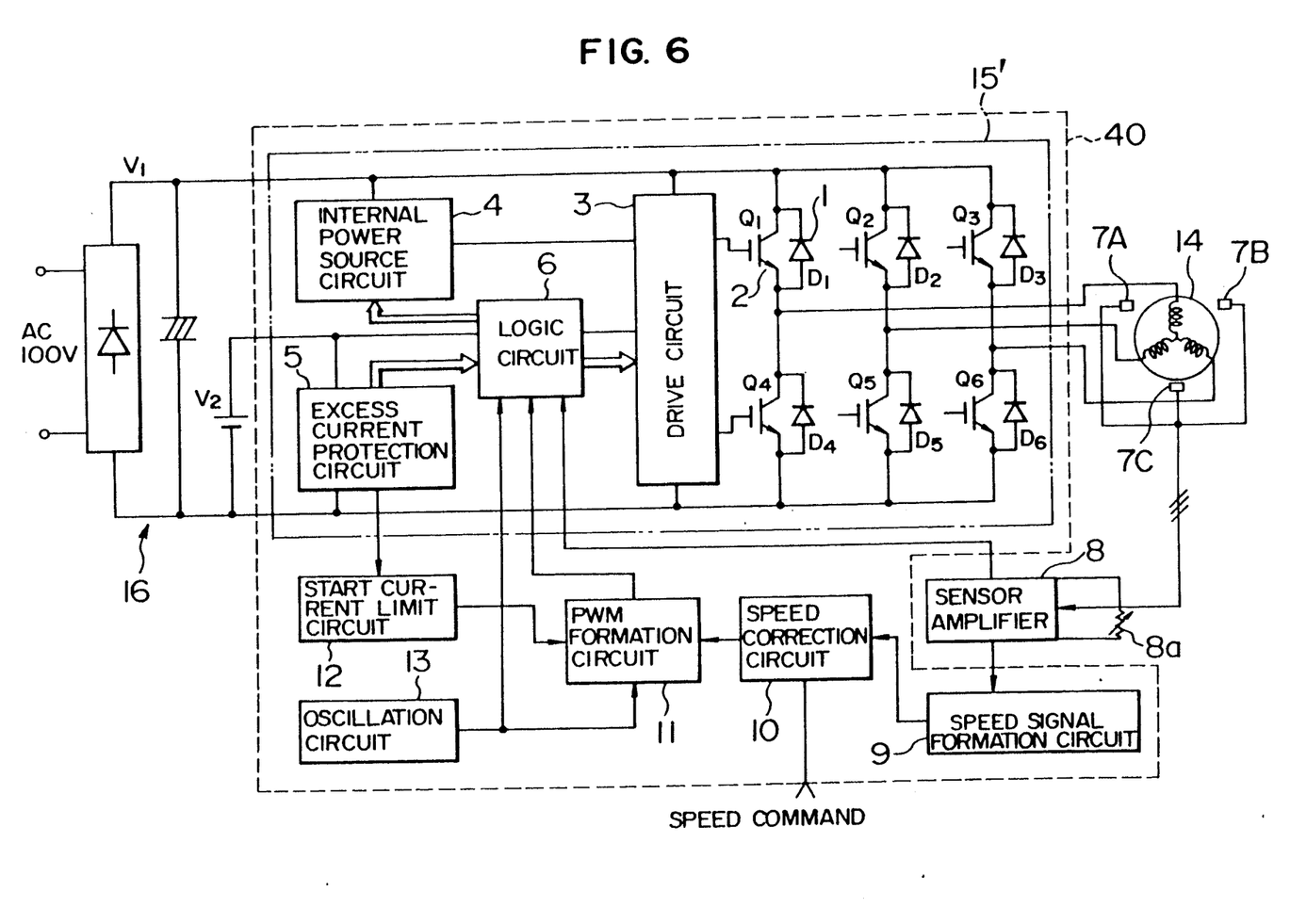
FIG. 6 is a block diagram of the peripheral circuits incorporated into an integrated circuit for a motor according to the present invention.
Figure 8:
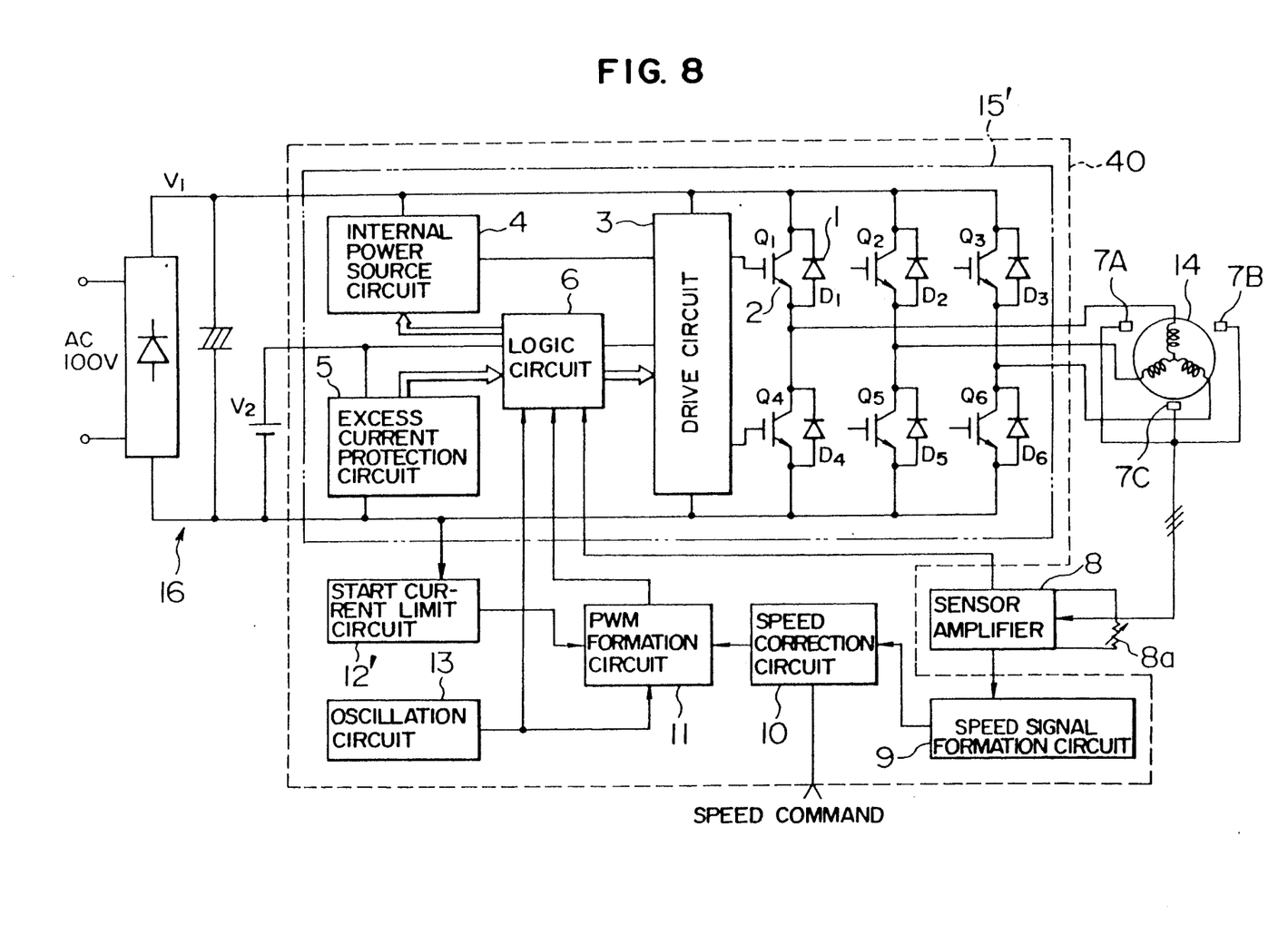
FIG. 8 is a diagram showing another embodiment of the peripheral circuits incorporated into an integrated circuit for a motor according to the invention.

On the upper surface of the printed wiring substrate 25, a circuit conductor pattern for the circuit structure shown in FIG. 6 or FIG. 8 is formed, the peripheral circuits 26 including the sensor amplifier 8 and the speed signal formation circuit 9, together with the Hall device sensors 7A, 7B and 7C and the one-chip three-phase inverter 15, are mounted thereon, and the terminal of the circuit conductor pattern is guided to the lower surface of the printed wiring substrate 25, with the lead wires 28 connected to the terminal.

The rotor 24, together with the shaft 22, is inserted into the inside of the stator core 18, and the bearings 23A are fixed to the upper surface of the inside of the upper case 17. When the rotor 24 is positioned, the upper portion of the shaft 22 extends to the outside through the opening 20 of the upper case 17. The printed wiring substrate 25 is fixed to the supporting members 21A, 21B and 21C which extend below the stator core 18, by the bolts 27A, 27B and 27C. The lower case 29 is fixed to the upper case 17 so as to cover the printed wiring substrate 25 and the stator core 18, by matching the bolt holes 34A, 34B, 34C and 34D at the edge portion of the upper case 17 with the openings 30A, 30B, 30C and 30D at the edge portion of the lower case 29 respectively and by fastening bolts 33 to the bolt holes 34A, 34B, 34C and 34D through the openings 30A, 30B, 30C and 30D. In this condition, the bearings 23B at the lower end of the shaft 22 are fixed within the opening 32 of the lower case 29 and the lead wires 28 are guided to the outside from the inside of the lower case 29 through the drawing duct 31.

Figure 5:
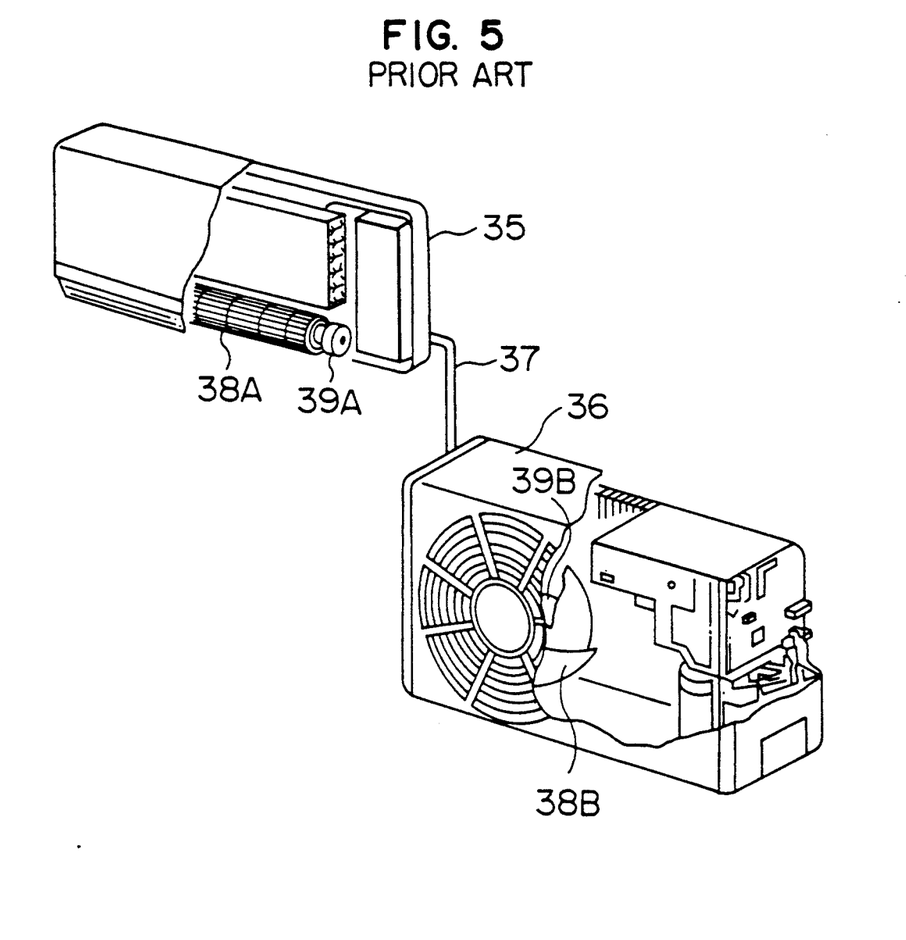
FIG. 5 is a configuration diagram of a room air conditioner.

FIG. 5 shows a partially extended view of the room air conditioner using the above-described motor as a fan motor. The room air conditioner comprises an indoor unit 35 disposed within a room, an outdoor unit 36 disposed outside the room and a pipe 37 connected between these units. A tangential floor fan 38A and a propeller fan 38B are provided in the indoor unit 35 and the outdoor unit 36 respectively. The above-described motor can be used as drive motors 39A and 39B for driving the fans 38A and 38B respectively. Usually, the three-phase inverter of the motor has about the same size as that of the motor body. However, since a one-chip three-phase inverter is incorporated in the above motor, the control section of the outdoor unit 36 can be made more compact by that amount, and the outdoor unit 36 itself can be made more compact accordingly. This also applies to the indoor unit 35.

A high-power device such as a switching transistor within the one-chip three-phase inverter is a heat service, and therefore it present a problem that the properties of the one-chip three-phase inverter are deteriorated, resulting in reduced reliability, when the one-chip three-phase inverter is heated to a high temperature. Accordingly, it is necessary to provide a heat radiation fan in the one-chip three-phase inverter.

However, as explained with reference to FIG. 4, not only the one-chip three-phase inverter 15 but also the Hall device sensors 7A, 7B and 7C and their peripheral circuits 26 are mounted in a large number on the printed wiring substrate 25, so that there has been no space to provide a heat radiation fan in the one-chip three-phase inverter 15 according to the prior art. As a result, about 20W has been the limit to the output of the motor.

SUMMARY OF THE INVENTION

It is an object of the present invention to provide a motor which solves the above problems and which provides a high output by making it possible to radiate heat from a three-phase inverter integrated circuit incorporated in the motor.

In order to achieve the above object, a three-phase inverter and peripheral circuits that have been mounted individually in the past are integrated together into a circuit, and this integrated circuit, a rotor speed detecting sensor, and an amplifier for amplifying the detected output of this sensor, are accommodated in the motor case.

According to the present invention, the three-phase inverter and peripheral circuits are integrated together into a circuit so that the number of parts to be mounted on the incorporated printed wiring substrate and the space occupied can be reduced substantially. Therefore, it is possible to provide heat radiation means for the integrated circuit by reducing the amount of space, and the output capacity of the motor can be increased substantially. Further, since the number of parts can be reduced substantially, it is also possible to reduce substantially the number of soldered connections on the printed wiring substrate, with a substantial improvement in the reliability of the circuit system in the substrate mounting.

Further, according to the present invention, the lower case of the motor is used as heat radiation means for the integrated circuit, so that it is possible to radiate heat from the integrated circuit without providing additional radiation means, resulting in further reduction in the number of structural parts and the number of soldered connections.

DESCRIPTION OF THE PREFERRED EMBODIMENTS

Embodiments of the present invention will be explained below with reference to the drawings.

Figure 7:
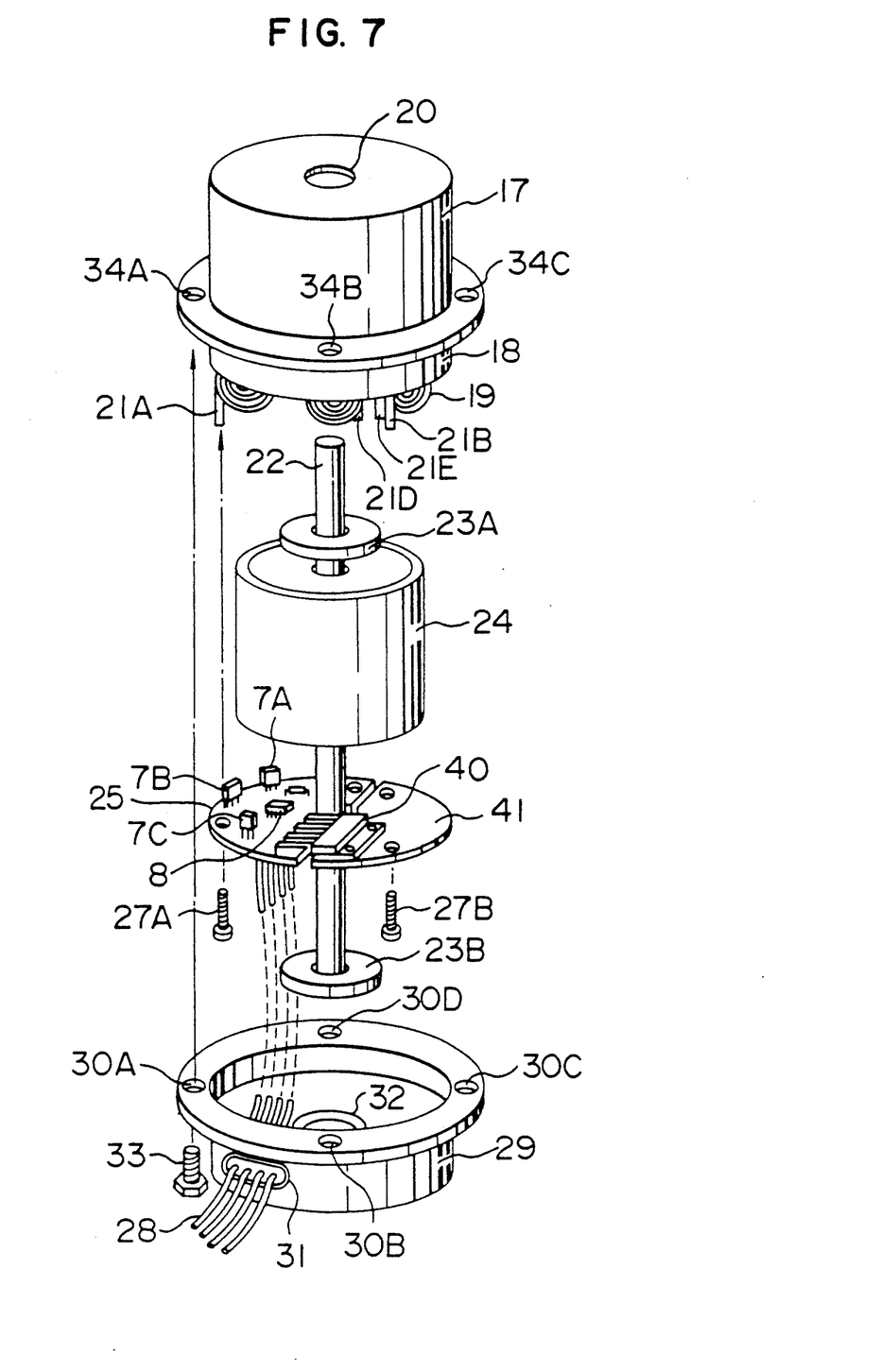
FIG. 7 is an exploded perspective view of a motor according to the present invention.

FIGS. 6 and 7 show one embodiment of the motor according to the present invention. FIG. 6 is a block diagram showing the circuit configuration, and FIG. 7 is an exploded perspective view thereof. In FIGS. 6 and 7, 15' designates a three-phase inverter, 21D and 21E supporting members, 40 a monolithic integrated circuit, and 41 a heat radiation panel, and portions corresponding to those in FIGS. 2 and 4 are identified with the same symbols to avoid the need for a duplicated explanation.

FIG. 6 will be explained first.

According to the prior art technique explained above, only the three-phase inverter 15' encircled by a two-dot line is integrated into a circuit on one chip to form the one-chip three-phase inverter. In the present embodiment, however, this three-phase inverter 15' and its peripheral circuits including the speed signal formation circuit 9, the speed correction circuit 10, the PWM signal formation circuit 11, the start current limit circuit 12, and the oscillation circuit 13 are all formed on a high withstand voltage monolithic integrated circuit on the same substrate, which are encircled by a broken line on FIG. 6. The size of the monolithic integrated circuit 40 is larger than that of the device of the conventional one-chip three-phase inverter 15 by about only 10%. Therefore, a package of the same shape and the same size as those of the package for the conventional one-chip three-phase inverter 15 can be used for housing the device of the monolithic integrated circuit 40.

A gain adjusting device such as a resistor 8a is provided in the sensor amplifier 8 for adjusting the gain, so that the gain can be adjusted at the time of assembling the motor.

The Hall integrated circuit incorporated in the sensor amplifier 8 may be used instead of the Hall device sensors 7A, 7B and 7C. In this case, a sufficiently high gain of the Hall integrated circuit can be obtained to avoid the need for the gain adjusting resistor 8a.

The excess current protection circuit 5 of the present invention prevents the integrated circuit from being destroyed by an excess current which is generated due to short-circuiting of the load or the like. The excess current protection circuit 5 detects the rate of rise (dv/dt) of a current from the stator and stops the system when the detected value is within a predetermined limit by regarding it as an excess current. If the detected value exceeds the predetermined limit, the start current limit circuit 12 is started.

The current of the stator may be detected directly to start the start current limit circuit 12. The circuit diagram in this case is shown in FIG. 8.

The only difference between FIG. 6 and FIG. 8 is an input signal to the start current limit circuit 12'.

FIG. 7 will be explained next.

When the above-described monolithic integrated circuit 40 is used, the number of parts to be mounted on the printed wiring substrate 25 and the mounting area can be reduced to about 1/20 and about ½ respectively as compared with those on the printed wiring substrate according to the prior art technique.

In the present embodiment, it is assumed that the printed wiring substrate 25 is formed in a half-disk shape and heat radiation means for the monolithic integrated circuit 40 are formed in the remaining half-disk portion.

To be more specific, the printed wiring substrate 25 is formed in a half-disk shape and is fixed to the supporting members 21A and 21D of the stator core 18, and a half-disk shape heat radiation panel 41 made of aluminum faces the printed wiring substrate 25 and is fixed to the supporting members 21B and 21E of the stator core 18. The printed wiring substrate 25 has mounted thereon the Hall device sensors 7A, 7B and 7C and the sensor amplifier 8 for supplying outputs of these sensors. On the heat radiation panel 41, the monolithic integrated circuit 40 shown in FIG. 6 is mounted such that the heat sink at the rear side of the monolithic integrated circuit 40 is brought into close contact with the heat radiation panel 41. Each of the pins of the monolithic integrated circuit 40 is connected to a predetermined terminal of the circuit conductor pattern on the printed wiring substrate 25.

As described above, according to the present embodiment, the three-phase inverter and its peripheral circuits are integrated into a monolithic integrated circuit, which is accommodated in a package of the same shape and the same size as those of the package for the conventional one-chip three-phase inverter. Therefore, it is possible to reduce the number of parts mounted on the printed wiring substrate 25 and the space occupied, and the heat radiation panel 41 made of an aluminum panel can be mounted on the portion corresponding to the space saved by the monolithic integrated circuit 40. Accordingly, sufficient heat radiation for the monolithic integrated circuit 40 can be obtained. As a result, the output capacity of the motor can be increased to about 50W from the conventional capacity of about 20W.

Further, since the number of parts mounted on the printed wiring substrate 25 is reduced, the number of soldered connections is also reduced, with an improved reliability of the circuit system mounted on the substrate. In this case, the number of soldered connections becomes about 1/100 of that of the prior art technique.

Figure 9A:
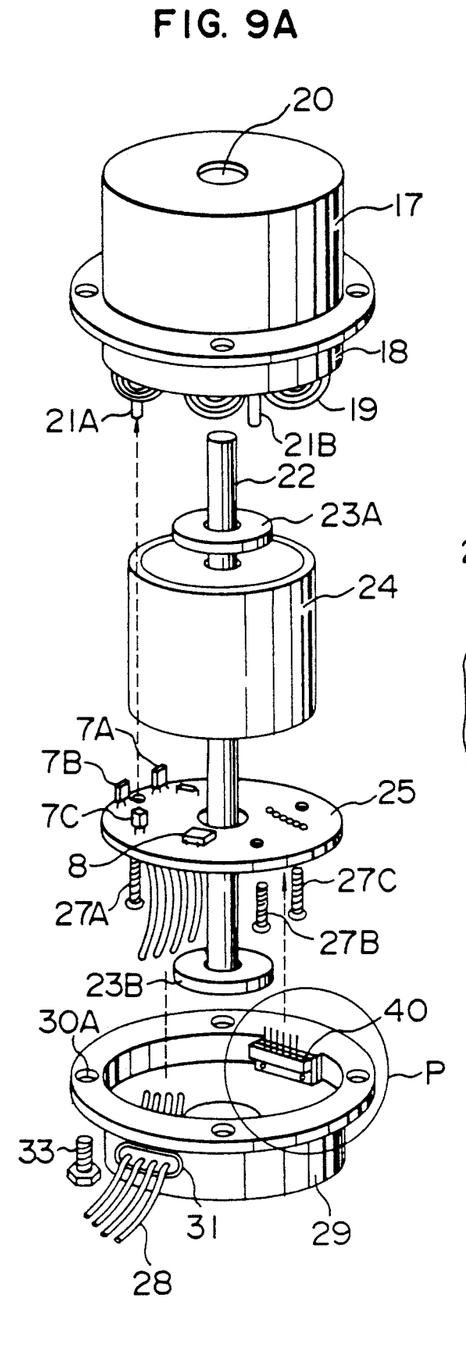
FIGS. 9A and 9B are diagrams showing another embodiment of a motor according to the present invention.
Figure 9B:
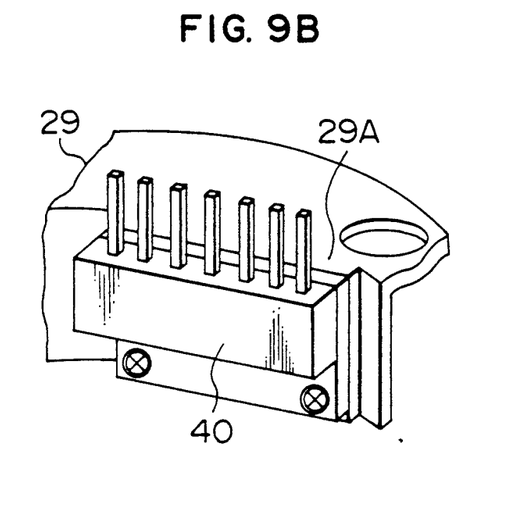

FIGS. 9A and 9B show another embodiment of a motor according to the present invention, wherein FIG. 9A is an exploded perspective view of the whole system and FIG. 9B is an expanded perspective view of the portion P in FIG. 9A. In FIG. 9B, 29A designates a projection portion, and portions corresponding to those in FIG. 4 and FIG. 6 are indicated with the same reference symbols to avoid a duplicated explanation.

Referring to FIG. 9A, the Hall device sensors 7A, 7B and 7C and the sensor amplifier 8 for supplying the outputs of these sensors, shown in FIG. 6, are mounted on the disk-shaped printed wiring substrate 25. The monolithic integrated circuit 40 shown in FIG. 6 is fitted to the inside wall of the lower case 29, and each of the pins therefore is connected to a predetermined terminal of the circuit conductor pattern formed on the printed wiring substrate 25.

The fitting of the monolithic integrated circuit 40 to the lower case 29 will be explained in detail. In FIG. 9B which is an expanded view of the portion P of FIG. 9A, a projection portion 29A having a plane surface is provided at one portion of the inside wall of the lower case 29, and the monolithic integrated circuit 40 is fixed to the surface of the projection portion 29A with bolts such that the rear side of the monolithic integrated circuit 40 is closely adhered to the surface of the projection portion 29A.

As described above, according to the present embodiment, the lower case 29 forms the supporting member for the monolithic integrated circuit 40 as well as forming the heat radiation material, so that the heat radiation effect for the monolithic integrated circuit 40 can be increased sufficiently. At the same time, the output capacity of the motor is also increased in a similar manner to that of the above preceding embodiment. The effect of less soldering is also obtained in the similar manner to that of the above preceding embodiment.

In each of the above embodiments, gain may be fixed in the sensor amplifier 8. If the sensor amplifier 8 is of the variable gain type, the gain adjusting means are mounted on the printed wiring substrate 25.

Figure 10:
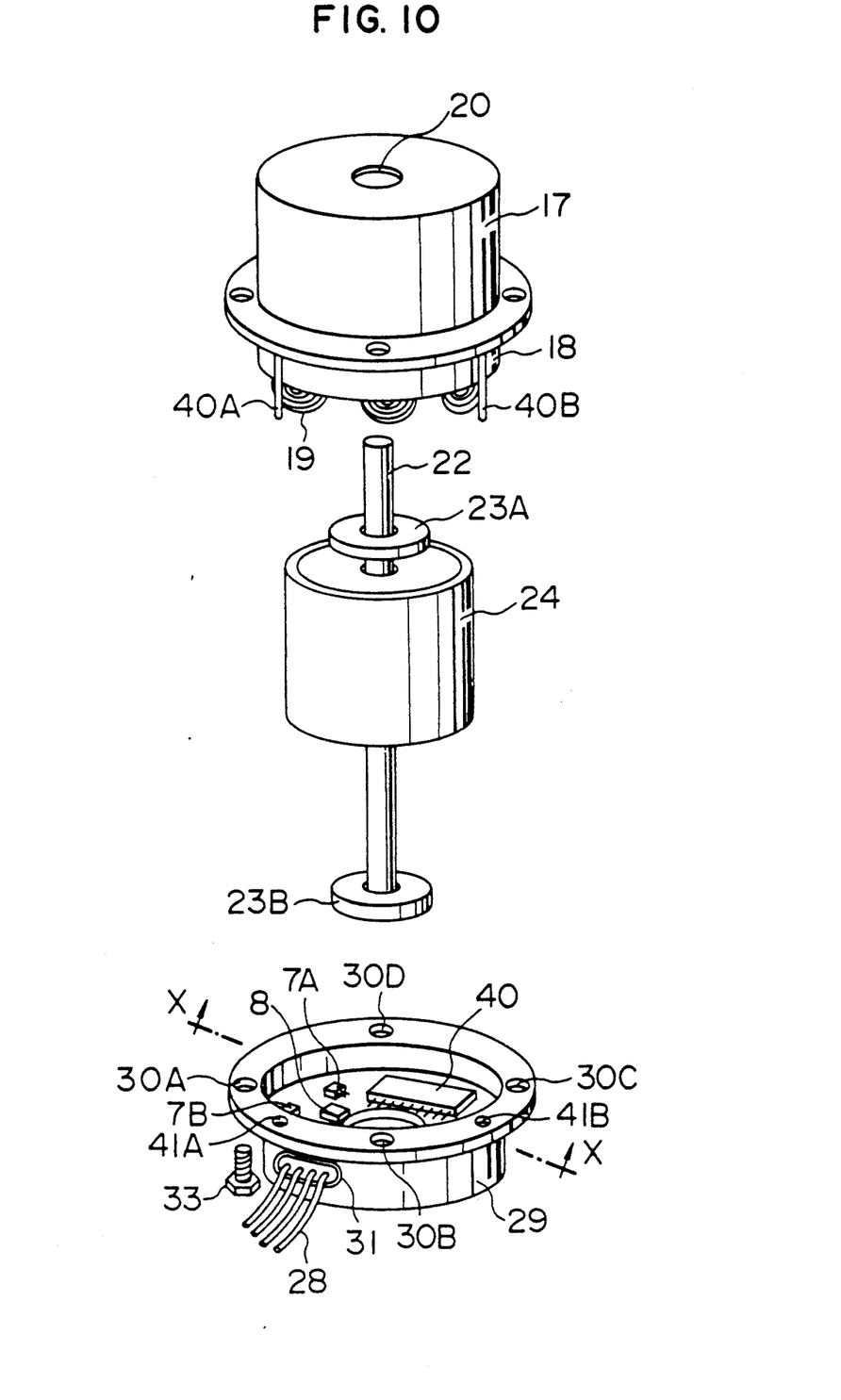
FIG. 10 is a diagram showing still another embodiment of a motor according to the present invention.

FIG. 10 shows another embodiment of the present invention. In the motor shown in FIG. 10, the substrate mounting the monolithic integrated circuit 40 and the peripheral circuit parts, is accommodated within the lower case 29. The Hall devices 7A to 7C (7C is not shown because it is not visible in the diagram) face the lower end surface of the rotor 24, to detect the speed of the rotor 24.

Figure 11A:
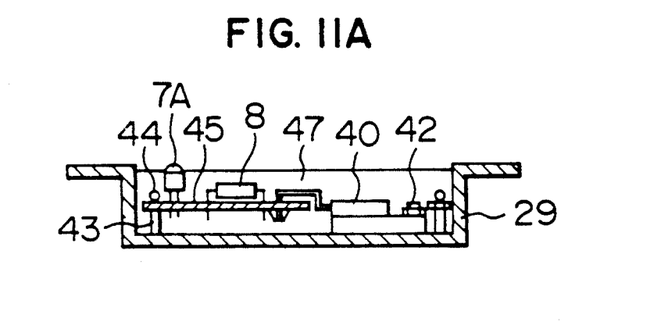
FIGS. 11A to 11D are diagrams showing embodiments for implementing the integrated circuit in FIG. 10.

Alternate cross sections of FIG. 10 cut along the line X—X are shown in FIGS. 11A to 11D. In FIG. 11A, the heat sink portion of the integrated circuit 40 is closely fixed to the inside bottom surface of the lower case 29 with a bolt 42. A supporting pillar 43 extends from the inside bottom surface of the lower case 29, and the printed substrate 45 is fixed to the supporting pillar 43 with a bolt 44. In the present embodiment, the size of the printed substrate 45 can be made substantially smaller than that of the substrate 25 in FIGS. 7 and 9A. The whole circuit is moulded with a moulding resin 47 to have strength against oscillation.

Figure 11B:
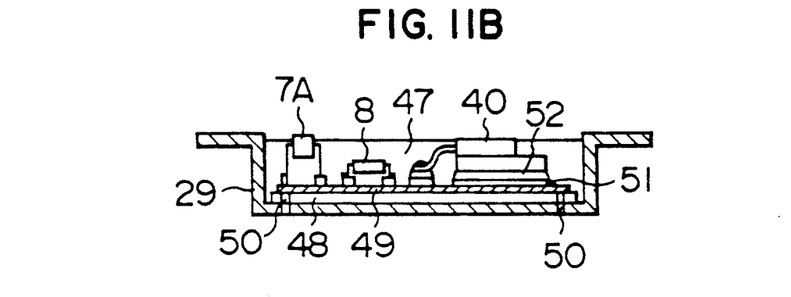

In FIG. 11B, a metal substrate 48 on which a copper circuit wiring pattern has been provided through an insulation resin 49 of satisfactory heat conductivity is closely fixed to the inside bottom surface of the lower case 29 with a bolt 50, and the heat sink portion of the rear side of the integrated circuit 40 is fixed by a solder connection 52 to the portion of the wide area of the wiring pattern 51 which is formed on the insulation resin 49. The Hall device sensors 7A to 7C and the sensor amplifier 8 are also electrically connected by soldering to a predetermined position of the wiring pattern 51. These are all moulded with the moulding resin 47 in the same manner as that shown in FIG. 11A. Heat generated by the integrated circuit 40 is transmitted to the lower case 29 through the solder connections 52, the wiring pattern 51, the insulation resin 49 and the metal substrate 48.

Figure 11C:
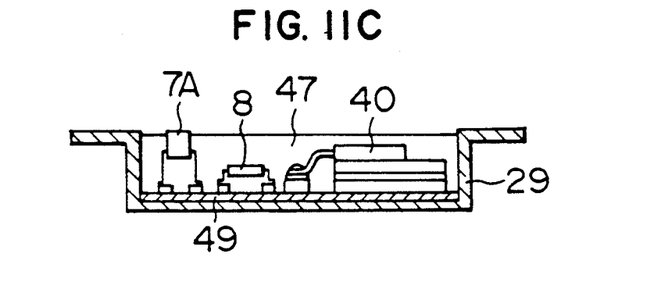

FIG. 11C shows the case where the insulation resin 49 is provided on the inside bottom surface of the lower case 29 and the metal substrate 48 in FIG. 11B is omitted.

Figure 11D:
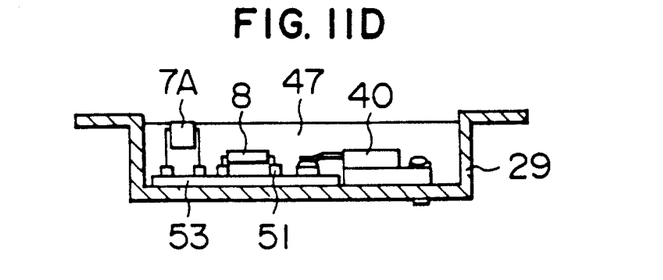

FIG. 11D shows the case where the integrated circuit 40 is fitted to the inside bottom surface of the lower case 29 as shown in FIG. 11A and further a flexible circuit substrate 53 is provided on the bottom surface, with the Hall device sensors 7A to 7C and the sensor amplifier 8 fitted to the flexible circuit substrate 53. A Hall integrated circuit incorporated in the amplifier may also be used instead of the Hall device.

We claim:

1. A brushless motor comprising:
   a first case member;
   a second case member cooperating with said first case member to form a motor casing; and
   accommodated in said motor casing:
   (a) a rotor;
   (b) a stator attached to said first case member;
   (c) a commercial power source connection for receiving commercial AC power;
   (d) an integrated circuit within said second case member so as to be separated from said stator, and including an inverter for rotatingly driving said rotor, a drive circuit for driving said inverter, a control circuit for controlling the speed of said rotor, a protection circuit for protecting said inverter from excess current, and a power converter connected to said commercial power source connection for converting the received commercial AC power to power for supplying to said drive circuit;
   (e) speed detection means for detecting the speed of said rotor, said speed detection means connected to said integrated circuit;
   (f) a substrate having mounted thereon said integrated circuit and said speed detection means; and
   (g) heat radiation means within said second case member and closely connected to said integrated circuit.

2. A brushless motor comprising:
   a first case member;
   a second case member cooperating with said first case member to form a motor casing; and
   accommodated in said motor casing:
   (a) a rotor;
   (b) a stator attached to said first case member;
   (c) an integrated circuit within said second case member so as to be separated from said stator, and including a high voltage inverter for inverting a voltage of at least 100 volts to rotatingly drive said rotor, a high voltage drive circuit for driving said inverter, a control circuit for controlling the speed of said rotor, a protection circuit for protecting said inverter from excess current, and a power source circuit for supplying power to said drive circuit;
   (d) speed detection means for detecting the speed of said rotor, said speed detection means connected to said integrated circuit;
   (e) a substrate having mounted thereon said integrated circuit and said speed detection means; and
   (f) heat radiation means within said second case member and closely connected to said integrated circuit.

3. A brushless motor according to claim 1, wherein said control circuit includes:
   a speed signal formation circuit responsive to the output of said speed detection means for providing a signal indicative of the speed of said rotor;
   a speed correction circuit responsive to a speed command signal from an outside source and to the output of said speed signal formation circuit for providing a speed correction signal to control the speed of said rotor;
   a PWM signal formation circuit connected to said speed correction circuit for providing a PWM signal to said inverter; and
   an oscillation circuit for generating a pulse signal of a predetermined frequency.

4. A brushless motor according to claim 3, wherein, said control circuit further includes:
   a start current limit circuit connected to said protection circuit for controlling said PWM signal formation circuit and adjusting the duty ratio of the PWM signal so that a start current does not become excessive.

5. A brushless motor according to claim 3, wherein said control circuit further includes:
   a start current limit circuit for detecting a current change in said stator and adjusting the duty ratio of the PWM signal based on the detected current change.

6. A brushless motor according to claim 1, wherein said substrate and said heat radiation means combine to form a disk shape, with a hole provided at the center of the disk for passage therethrough of an axis of said rotor.

7. A brushless motor according to claim 1, wherein said heat radiation means is an inside wall surface of said second case member.

8. A brushless motor according to claim 1, wherein said heat radiation means is an inside bottom surface of said second case member.

9. A brushless motor according to claim 6, wherein said second case member is moulded.

10. A brushless motor according to claim 1, wherein said speed detection means includes:
    a plurality of Hall device sensors;
    means for amplifying the output of said sensors; and
    means for changing the gain of said amplifying means.

11. A brushless motor according to claim 1, wherein said speed detection means is a Hall integrated circuit.

* * * * *